UNITED STATES PATENT OFFICE.

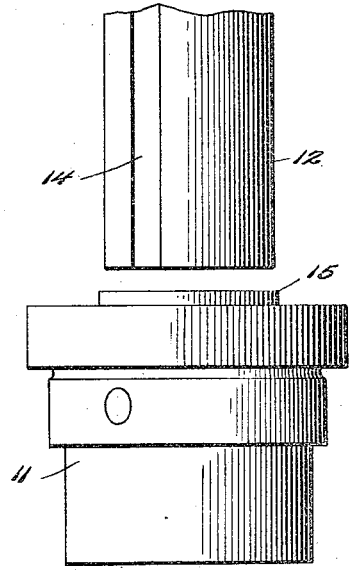
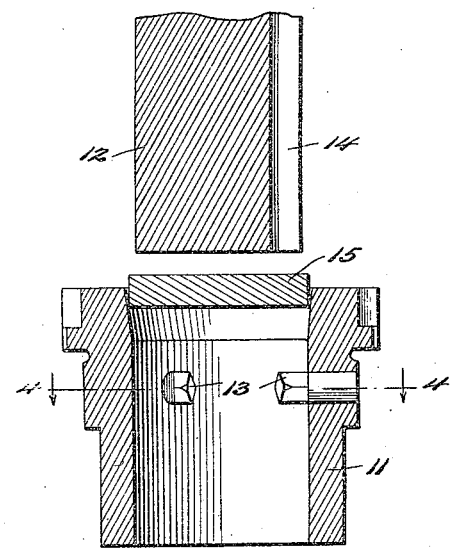
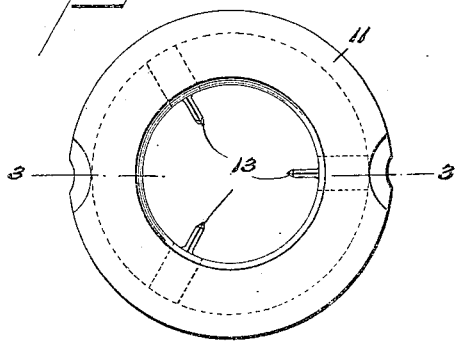
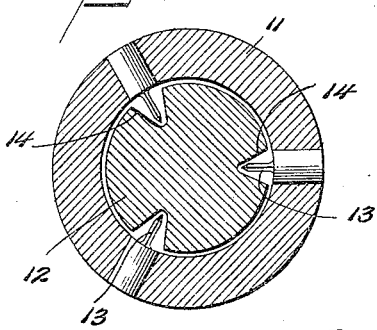

FRANKLIN W. OLIN, OF ALTON, ILLINOIS, ASSIGNOR TO WESTERN CARTRIDGE COMPANY, A CORPORATION OF NEW JERSEY.

WAD BUSHING FOR LOADING MACHINES.

1,419,941.          Specification of Letters Patent.    Patented June 20, 1922.

Application filed April 18, 1921. Serial No. 462,233.

*To all whom it may concern:*

Be it known that FRANKLIN W. OLIN, a citizen of the United States, and resident of Alton, county of Madison, State of Illinois, has invented an Improvement in Wad Bushings for Loading Machines, of which the following description, in connection with the accompanying drawings, is a specification, like characters on the drawings representing like parts.

One disadvantage of loading machines as heretofore constructed is the liability of air to be caught in the shell below the wad and either tip the wad or force it out of place when the pressure of the wad ramming plunger is removed if the operation is performed too rapidly.

This invention aims to improve and facilitate the loading of shot shells and cartridges containing one or more wads. This invention also aims to increase the speed with which the ramming operation may be performed by preventing the trapping of air in the shell beneath the wad during the ramming operation.

Further aims and advantages of the invention appear in connection with the following description of a preferred form of device for practicing the invention, illustrated in the accompanying drawings, in which—

Fig. 1 is a side view of a wad bushing and lower end of a ramming plunger of a loading machine of any suitable type;

Fig. 2 is a plan view of the bushing;

Fig. 3 is a vertical central section through the bushing and plunger on the line 3—3 in Fig. 2; showing a wad in position for ramming; and Fig. 4 is a horizontal section of the wad bushing and plunger on the line 4—4 in Fig. 3, the plunger being shown down in the bushing ready to ram the wad into the shell.

I have discovered that by punching a hole through each wad, or by slitting its edge in one or more places, it is possible to speed up the wad ramming operation of an automatic loading machine, as the air which otherwise would be trapped in the shell beneath the wad is thereby permitted to escape.

In order to save punching or slitting the wads prior to the loading operation, I have devised a wad loading bushing and punch for slitting the edges of the wads as they are rammed into the shells, but my invention is not restricted to this means of attaining it.

Referring to the drawings, the bushing 11 and punch 12 are of any usual and suitable form for the loading machine in which they are to be used, excepting that the bushing is provided with one or more cutters or knives 13 and the plunger has one or more longitudinal grooves 14 in its periphery to accommodate the knives 13 when it is forced through the bushing to ram the wad into the shell.

In the form shown in the drawings there are three knives and three grooves, arranged symmetrically around the axis of the bushing and plunger. The knives preferably have sharp upper edges and ends, but may be shaped to suit the wads and speed at which it is desired to operate. Considerable space is left between the knives 13 and walls of the grooves 14 in order to permit free escape of air past the knives when the plunger is down.

The operation of the device in a loading machine of any of the common types is as follows: The wads 15 (see Fig. 3) are fed successively into the upper mouth of the wad bushing by a suitable feeding device (not shown) and the successive shells are fed beneath the wad bushing simultaneously with the wads. The operation of the machine to feed the shells and wads to position for ramming is similar to the loading machines heretofore in use, and the operating parts are not shown in the drawings.

Each wad is rammed into the shell beneath the wad bushing 11 by the descent of the plunger 12, which forces the wad past the knives 13 and thereby scores its edges and permits any air trapped in the shell to escape through the slit edges of the wad and grooves in the plunger.

The invention is not restricted to an automatically operating loading machine nor to the use of slitting knives arranged in the wad bushing as shown.

I claim the following as my invention:

1. The method of ramming wads into shells which comprises forcing them through a wad bushing provided with sharp projections on its inner wall prior to inserting them into the shells, whereby the periphery of each wad is scored sufficiently to permit passage of air through said scored places, and applying pressure to the unscored portions to seat them in place.

2. The method of ramming wads into shells which comprises forcing them through a wad bushing provided with projections on its inner wall and permitting entrapped air to escape through the nicks thereby formed.

3. Means for ramming wads into shells comprising a bushing for guiding the wads into the mouths of the shells, said bushing being provided with means for deforming the edges of the wads sufficiently to permit passage of air from the shell when rammed therein, and a plunger for forcing the wads through the bushing and ramming them into the shells.

4. Means for ramming wads into shells comprising a bushing for guiding the wads into the mouths of the shells, said bushing being provided with means for deforming the edges of the wads, and a plunger for forcing the wads through the bushing and ramming them into the shells, said plunger having grooves in its periphery corresponding to said deforming means.

5. Means for ramming wads into shells comprising a bushing for guiding the wads into the mouths of the shells, said bushing being provided with knives for scoring the edges of the wads, and a plunger for forcing the wads through the bushing and ramming them into the shells, said plunger having grooves in its periphery to receive said knives as it moves through said bushing.

6. A wad ramming bushing having nicking means on its inner wall for engaging and scoring wads as they are forced through it to permit escape of air trapped in the shell.

In testimony whereof, I have signed my name to this specification.

FRANKLIN W. OLIN.